US006779146B1

United States Patent
Jones et al.

(10) Patent No.: US 6,779,146 B1
(45) Date of Patent: Aug. 17, 2004

(54) ARQ FOR POINT TO POINT LINKS

(75) Inventors: Vincent K. Jones, Redwood Shores, CA (US); Gregory G. Raleigh, El Granada, CA (US); David P. Bokaie, Pleasanton, CA (US); Joseph Middleton, Fremont, CA (US); Ali Raissinia, Monte Sereno, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/287,212

(22) Filed: Apr. 5, 1999

(51) Int. Cl.[7] .............................. G08C 25/02; H04L 1/18
(52) U.S. Cl. ........................................ 714/748; 370/345
(58) Field of Search ................................ 714/748, 749, 714/774, 751–752, 776, 758, 336, 345, 428; 370/216, 242, 389, 471, 330, 368; 379/93.08; 455/445; 345/535, 558; 710/57; 711/154

(56) References Cited

U.S. PATENT DOCUMENTS

| 5,600,663 A | * | 2/1997 | Ayanoglu et al. ........... 714/774 |
| 5,629,948 A | | 5/1997 | Hagiwara et al. ............. 371/32 |
| 5,673,416 A | * | 9/1997 | Chee et al. .................. 345/535 |
| 5,715,527 A | | 2/1998 | Horii et al. .................. 455/126 |
| 5,784,362 A | | 7/1998 | Turina ........................ 370/321 |
| 5,870,406 A | | 2/1999 | Ramesh et al. ................ 371/6 |
| 6,023,470 A | * | 2/2000 | Lee et al. .................... 370/401 |
| 6,091,947 A | * | 7/2000 | Sumner ..................... 455/413 |
| 6,359,877 B1 | * | 3/2002 | Rathonyi et al. ........... 370/232 |
| 6,377,561 B1 | * | 4/2002 | Black et al. ................ 370/330 |

OTHER PUBLICATIONS

WO 9512946: Abstract.*

* cited by examiner

Primary Examiner—Guy J. Lamarre
(74) Attorney, Agent, or Firm—Ritter, Lang & Kaplan LLP

(57) ABSTRACT

An automatic retransmission system offering good latency and overhead characteristics combined with programmable tradeoffs among overhead, latency, and error performance. ARQ (Automatic Repeat reQuest) blocks present at both ends of a link coordinate to automatically attempt to re-send data if that data was not received properly the first time it was sent. Re-transmission from the transmitter (transmitter) is requested by the receiver (Receiver) via a highly reliable "Repeat Request" (RR) mechanism. This RR scheme carries sufficient information back to the transmitter for it to determine which previous transmissions need to be re-sent.

17 Claims, 7 Drawing Sheets

ARQ FOR POINT TO POINT LINKS

STATEMENT OF RELATED APPLICATIONS

The present application is related to the subject matter of the co-filed application entitled EFFICIENT MULTIPLE PRIORITY LIST MEMORY SYSTEM, U.S. application Ser. No. 09/287,214 the contents of which are herein incorporated by reference for all purposes.

BACKGROUND OF THE INVENTION

The present invention relates to digital communications across error-inducing links and more particularly to systems and methods for ameliorating errors by retransmitting unsuccessfully communicated data upon request.

Retransmitting data upon request is a well-known method for improving error performance in data communication systems where errors are detectable and a link from the receiver to the transmitter is available. Systems that provide this retransmission capability are often known as ARQ (Automatic Retransmission Request) systems. For example, if a single request for retransmission may always be made and fulfilled, a channel having a bit error rate of $1\times10^{-6}$ may have its effective bit error rate reduced to $1\times10^{-12}$.

A disadvantage of ARQ is that link capacity is in part consumed by requests for retransmission and by retransmitted data. Thus there is associated overhead. This overhead will vary depending on the ARQ system design. ARQ design parameters that affect overhead include the number of repeat requests generated per error, the number of retransmissions for every repeat request, and the block sizes for which retransmission is requested. For example, increased numbers of repeat requests and/or retransmission will improve link error performance but at the expense of link capacity.

Also, ARQ is typically associated with an increase in latency across the link. Received data is often buffered to allow time for retransmission requests to be processed for data blocks received in error. The more time is allowed, the higher the probability that one or more retransmission requests will ultimately result in a successful transmission. On the other hand, some types of traffic, e.g., voice cannot tolerate high latency.

With the increased use of Internet Protocol (IP) in the Internet and other applications, it is desirable to support IP networks with two-way point-to-point links that are subject to transmission errors. For example, it is highly desirable to use wireless point-to-point links to support IP links. However, voice and other types of traffic increasingly carried by IP networks cannot tolerate high latency but can tolerate somewhat higher error rates. Current ARQ schemes have difficulty adequately servicing mixes of voice and data traffic because of their differing requirements for latency and error rates.

What is needed is an ARQ scheme that provides programmable overhead and latency. Furthermore, it is desirable to minimize latency and overhead caused by ARQ while maximizing link error performance.

SUMMARY OF THE INVENTION

An automatic retransmission system offering good latency and overhead characteristics combined with programmable tradeoffs among overhead, latency, and error performance is provided by virtue of the present invention. ARQ (Automatic Repeat request) blocks present at both ends of a link coordinate to automatically attempt to resend data if that data was not received properly the first time it was sent. Re-transmission from the transmitter (transmitter) is requested by the receiver (Receiver) via a highly reliable "Repeat Request" (RR) mechanism. This RR scheme carries sufficient information back to the transmitter for it to determine which previous transmissions need to be re-sent.

Available capacity for retransmission requests is shared fairly among pending requests. At least one RR is sent for every block of bad data before any block of data has two RRs sent. Similarly, at the transmitter, every pending retransmission request is fulfilled at least once before any retransmission request is fulfilled twice. The average and burst capacity for handling overhead are programmable. A transmitter memory holds a copy of recently sent data to fulfill retransmission requests while a receiver memory buffers up received data to allow time for "gaps" in this data to be filled with good re-transmitted data before the data exits the receiver memory.

According to a first aspect of the present invention, a method for combining transmission of new data with retransmission of data requested by a receiver includes: allocating a data transmission opportunity for either data transmission or data retransmission based upon monitoring of available overhead for retransmission, and transmitting or retransmitting during the data transmission opportunity according to the allocation.

A further understanding of the nature and advantages of the inventions herein may be realized by reference to the remaining portions of the specification and the attached drawings.

DESCRIPTION OF SPECIFIC EMBODIMENTS

Communication System Overview

Figures 1A, 1B:
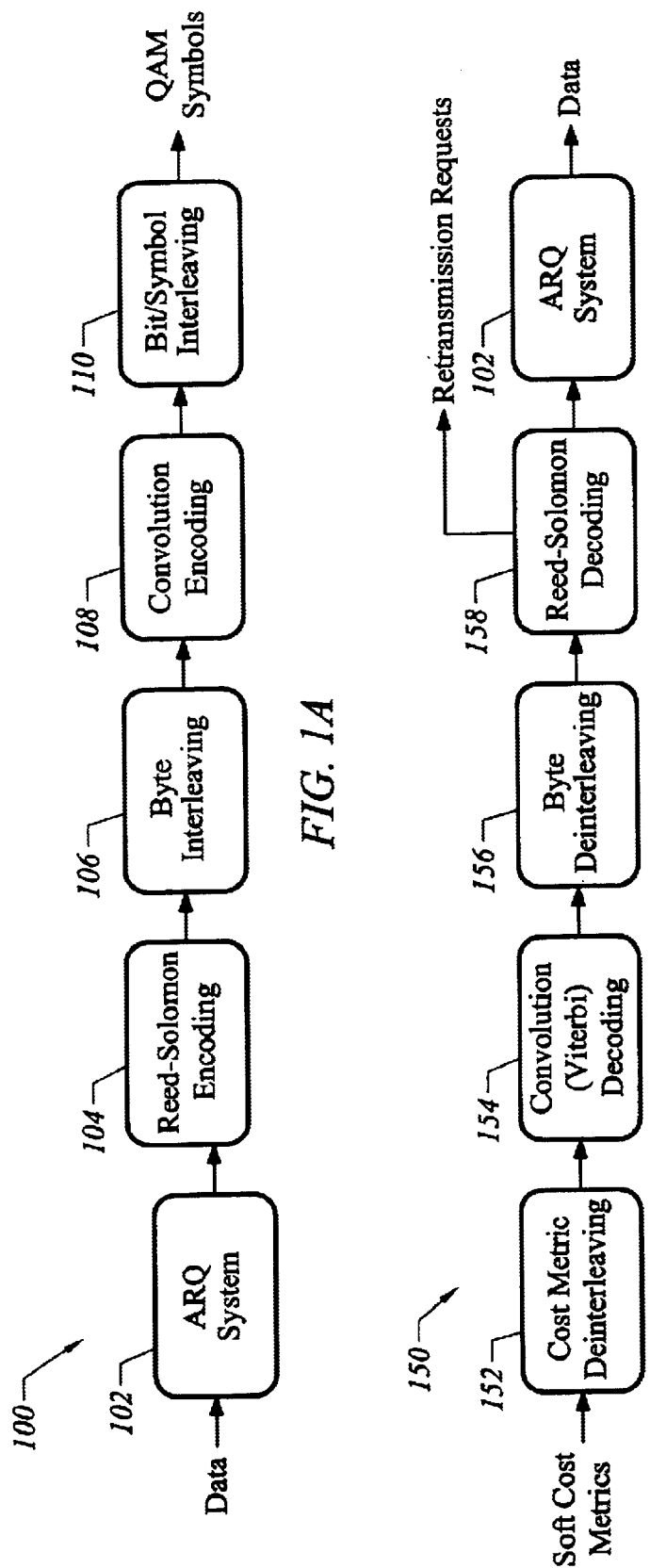
FIG. 1A depicts a transmitter system according to one embodiment of the present invention.
FIG. 1B depicts a receiver system according to one embodiment of the present invention.

One embodiment of the present invention operates in the context of a digital communication system where transceivers operate at both sides of a link. FIG. 1A depicts a transmitter portion 100 of such a transceiver according to one embodiment of the present invention. An ARQ system 102 coordinates retransmission of data at the request of the receiver. ARQ system 102 also organizes data to be transmitted into codewords that represent the input to a Reed-Solomon encoder 104. ARQ system 102 includes a transmitter buffer to store previously transmitted codewords to facilitate their retransmission upon request. A byte interleaving stage 106 interleaves bytes. A convolutional encoding stage 108 applies a convolutional code. A bit/symbol interleaver 110 interleaves at the bit or symbol level. The output of bit/symbol interleaver 110 is a stream of e.g., QAM (quadrature amplitude modulation )symbols or other symbols which may be upconverted for transmission across a channel. For OFDM (Orthogonal Frequency Division Multiplexing) systems, an IFFT (inverse Fast Fourier Transform) may be applied first. The present invention is, however, not limited to any particular modulation or coding system.

FIG. 1B depicts a representative receiver portion 150 of the transceiver. A bit/symbol deinterleaving stage 152 is applied to soft decision estimates of received symbols. Convolutional coding is removed by a convolutional decoding stage 154 which is typically a Viterbi decoder. This is followed by a byte deinterleaving stage 156 and a Reed-Solomon decoding stage 158. Reed-Solomon decoding stage 158 outputs codewords that have been successfully decoded without errors to ARQ system 102 which shared with transmitter portion 100. For codewords whose errors cannot be corrected, Reed-Solomon decoding stage 158 indicates an error to the ARQ system 102 so that a retransmission request is triggered.

ARQ System Overview

Figure 2:
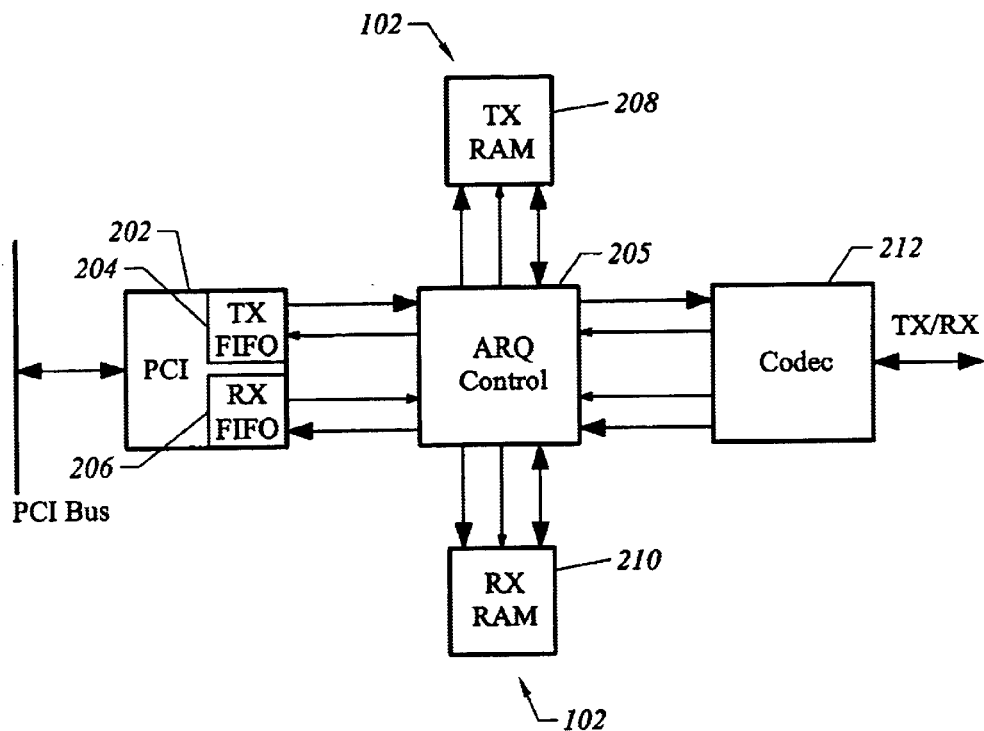
FIG. 2 is a top-level block diagram of a transceiver ARQ system according to one embodiment of the present invention.

FIG. 2 depicts a simplified representation of components of ARQ system 102 and its external interfaces. Data to be transmitted originates in a PCI bus system 202 or other data source and is pulled from a transmitter FIFO 204 by an ARQ control block 205. Received data output by ARQ control block 205 is also sent to PCI bus system 202 by way of insertion into a receiver FIFO 206. ARQ control block 205 forms data to be transmitted into codewords. Transmitter RAM 208 stores previously transmitted codewords to allow for retransmission upon request of the ARQ system at the other end of the link. Transmitter RAM 208 does not add latency. A receiver RAM 210 buffers previously received codewords to allow time for insertion of codewords that are correctly received only after one or more retransmissions. Receiver RAM 210 does add latency. The other non-ARQ blocks of FIGS. 1A–1B are represented in FIG. 2 by a codec 212. Codec 212 accepts input from a receiver system (not shown) and provides output to a transmitter system (not shown).

Definitions

The discussion that follows will be assisted by reference to the following definitions. Some of the definitions include terms and concepts from the description that follows. The definitions include description of the operation of a specific embodiment.

Codeword: Any grouping of data that may be determined to be correct or in error at a receive end. A codeword may be a grouping of data that is sent to an encoding process at the transmit end and recovered from a decoding process at the receive end. In one embodiment, a codeword includes 227 payload bytes, 5 header bytes, and 20 check bytes. The ARQ system preferably processes only the header field addition, not the check bytes. There may be two types of codewords:

1. low latency codewords (typically voice)
2. higher latency codewords (typically data)

These will be referred to herein as voice and data codewords.

ARQ codewords: Repeat transmissions of codewords that occur as a result of the ARQ system.

Supercodeword: A collection of four or some other number of consecutive codewords sent over the link. The supercodeword concept allows more efficient repeat request signaling from the receiver to the transmitter when bursts of codeword errors occur.

Transmitter: The originator of a codeword. The transmitter does the initial transmission of the codeword. The transmitter receives repeat requests and upon satisfaction of certain conditions, fulfills the repeat requests by transmitting ARQ codewords.

Receiver: The receiver receives the codeword transmission. The receiver sends repeat requests if codeword errors occur.

Receiver memory: A record of received codewords (good and bad) that provides the required latency to allow codeword re-transmissions to replace holes left by initially bad codeword reception.

Transmitter memory: A record of which codewords, and in what order, were sent over the link. The memory locations define which codewords are collected into which supercodewords. This record includes the header with the original DS, TS and data. The terms DS and TS are defined below.

Repeat Requests (RRs): The request for one or more errored codewords (up to the number of codewords in a supercodeword) to be re-transmitted through the link. This is communicated to the transmitter via an RR field in the header attached to the start of each codeword.

Data Stamp (DS): An identification number assigned by the transmitter to each codeword pulled from the source and attached to the codeword in the header. DS values are allocated sequentially until all values have been used, whereupon the assignment sequence repeats. As codewords are read out of the receiver memory, any discontinuity in the DS sequence indicates how many codewords were never correctly received.

Transmit Index (TXI): A unique (over the latency span of the ARQ system) address in transmitter memory where the first byte of a previously transmitted codeword is located. As with the DS, when all addresses have been used, the TXI address sequence starts over. The TXI increments for each codeword transmitted, and forms the Time Stamp (TS) in the header for the first transmission of new codewords.

Time Stamp (TS): The TXI associated with the first transmission of a new codeword. This value is inserted in the header for the codeword and is fixed for the life of the codeword.

Receive Index (RXI): A unique (over the latency span of the ARQ system) index associated with each codeword as it is received. If the codeword is in error, this index is entered into an RR system for generating an RR. If the codeword is received correctly, the index is not used; instead the TS is used as the address where the codeword is written into receiver memory. If the good codeword is a first-pass codeword (i.e.: not a retransmission generated by the ARQ system), then the TS and RXI will be equal. This is because when the ARQ system is operating properly, the TXI and RXI are synchronized such that the RXI associated with each received codeword is the same as the TXI where that codeword has been stored in transmitter memory. The RXI increments for every codeword received.

Supercodeword Index (SCWI): An identification number associated with supercodewords and used in the RR (repeat request) process. The SCWI is determined by where in the transmitter memory (as given by the TXI) the codewords belonging to the supercodeword are located. Each codeword in the SCWI has the same TXI except for the least significant bits which identify the particular codeword in the supercodeword. At the receiver, the RXI is synchronized to the TXI, allowing the receiver to indicate to the transmitter which codewords in which supercodeword were in error.

Supercodeword error vector (SCWEV): A bit pattern in an RR field of a supercodeword that indicates via the position of "set" bits which codewords in a supercodeword were not received correctly. There is one bit for each codeword in the supercodeword.

Codeword holes: Locations in receiver memory that ARQ codewords have so far failed to fill which originally resulted when a first transmission of a codeword was not received. Codeword holes imply that one or more ARQ holes may exist.

ARQ holes: Locations in receiver memory where there was a codeword error, and the transmitted codeword was an ARQ codeword. These holes will never be filled, and are not counted as ARQ errors when the codeword reaches the output of the receiver memory.

ARQ markers: Locations in receiver memory where an ARQ codeword was correctly received. The ARQ codeword is not written to this location, but the location is marked as coinciding with a good ARQ codeword. These do not result in errors when they reach the output of the receiver memory. Note that the actual location that the codeword is written to is given by its TS.

Overhead counter: A counter at the transmitter that determines if the next codeword transmission slot can be used for an ARQ codeword.

Priority lists: At the transmitter, there is a multilevel list of requested TXI's that point to the codewords to be sent as ARQ codewords. The levels are assigned different priorities; entries in the highest priority list are serviced first. This assures that available overhead capacity is shared among pending retransmission requests. At the receiver, priority lists are also used to keep the SCWI and SCWEV used in generating RRs.

ARQ flag bit (A): A bit inserted by the transmitter in the header of each codeword to indicate that the codeword is an ARQ codeword. If the bit is not set, it indicates to the receiver that this is a first-pass codeword and that the TS field in the header is valid for RXI synchronization purposes. The ARQ flag bit will be the same as a service flag bit kept at the transmitter for that codeword.

Service Flag (SF): A bit kept at the transmitter and associated with each possible TXI. When an RR is decoded into TXIs, the SF corresponding to each TXI in the RR is checked to see if it is set. If not, the SF is set and the TXI is entered into the ARQ priority lists. If on the other hand the SF bit was already set, it indicates that an RR for that particular TXI has already been received and thus an ARQ process has already been started. The SF bit at the location given by the TXI when an ARQ codeword is sent through the link also gets set.

Voice bit (V): A bit in the transmitted codeword header that, when set, indicates that the codeword contains voice or other low-latency data.

ARQ Operation

Codewords received at the receiver may be in error. Receipt of a bad codeword may trigger one or more RRs depending on available overhead. Receipt of an RR by the transmitter may trigger one or more retransmissions of a previously transmitted codeword depending on available overhead. Available overhead for retransmission is determined both on an average and burst basis.

According to one embodiment of the present invention, transmission of RRs and ARQ codewords is decoupled between the opposing sides of the link. Erroneously received codewords may trigger RR transmission. However, on the transmit side, RRs are not responded to for erroneously received ARQ codewords. The number of RRs or ARQ codewords transmitted preferably does not depend on whether they are successfully received but rather only on available bandwidth. This decoupling between ends of the links saves on latency across the link.

Overhead is preferably shared among pending RRs and among pending ARQ codewords. For example, each RR is transmitted once before any pending RR is sent twice. This is accomplished by establishing a set of RR priority lists, the number of lists corresponding to a maximum number of retransmissions for a particular RR. A new RR is placed on the highest priority list and each time it is serviced, it is shifted to the next lowest priority list. All RRs on the highest priority list are serviced first before the next highest priority list is serviced and so on. A similar mechanism operates for transmission of ARQ codewords.

To optimize the transmission of RR information, transmitted codewords are organized into supercodewords. In a preferred embodiment, each supercodeword includes four codewords that have been consecutively transmitted across the link.

Each codeword input to the ARQ system is sequentially assigned a DS value. Previously transmitted codewords are stored in transmitter RAM 208 and are addressed by their TXI. There will be multiple reserved spaces in transmitter RAM 208 for codewords that have been transmitted more than once. The timestamp or TS of a codeword is the TXI for the codeword's first transmission.

In summary, some codewords that are received in error and may cause the transmission of RRs and possibly the creation of entries on the ARQ priority lists. Some of the ARQ requests that have been stored on the ARQ priority lists will cause the transmission of ARQ codewords depending on available bandwidth.

Received codewords are written to receiver RAM 210. Correctly received codewords are written to memory at an address indicated by their TS values. An RXI counter is maintained at the receive end and is synchronized to the TXI value at the transmit end. Incorrectly received codewords cause transmission of an RR.

RRs are transmitted within a logical channel created by reserving an RR field in each codeword. The RR field identifies a previously transmitted supercodeword and the pattern of codeword errors within that supercodeword.

The value of the write pointer to receiver RAM 210 depends on the type of codeword that is to be written. For good codewords, the write pointer gets the TS value which is equivalent to the RXI value for initial transmissions but not equivalent to the RXI value of ARQ codewords. The write pointer takes on the RXI value for incorrectly received codewords. The RXI value acts as a write pointer to receiver RAM 210 for errored codewords. Preferably, errored codewords are not actually written in full to receiver RAM 210, rather only a first synchronization byte is written including an error indication.

Data is read out from receiver RAM 210 to PCI system 202 according to a read pointer position. The distance between the read pointer and RXI fixes the latency for the ARQ system across the link. In a fixed latency mode, the read pointer will be a fixed distance behind the RXI values. In a variable latency mode, the read pointer may catch up to the RXI value if codewords between the present read pointer position and the RXI value have been successfully received. Also, in one embodiment, there are multiple, e.g., 2, read pointers to accommodate codewords carrying different latency traffic. The read pointer for low latency traffic, e.g., voice traffic, will follow the RXI value more closely than the read pointer for high latency traffic.

Figure 3:
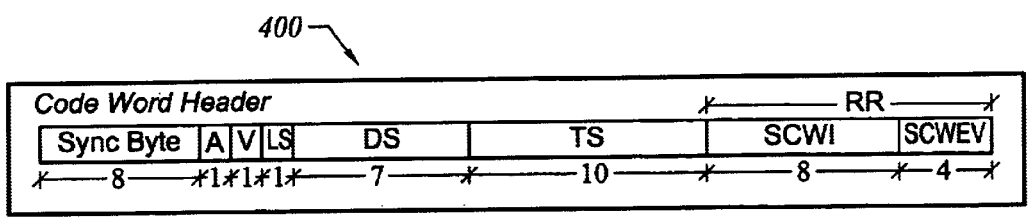
FIG. 3 is a diagram depicting the format of a codeword according to one embodiment of the present invention.

FIG. 3 is a diagram depicting the format of a codeword header 400 according to one embodiment of the present invention. In FIG. 3, Sync Byte may be used for synchronization by functional systems other than ARQ.

A=ARQ flag bit

V=Voice flag bit

LS=Local Sync status bit may indicate to non-ARQ systems at a remote end that the local receiver has synchronized DS=DS value TS=TS value.

SCWI=SCWI value.

SCWEV=SCWEV value; and

RR=Repeat Request field.

Figure 4:
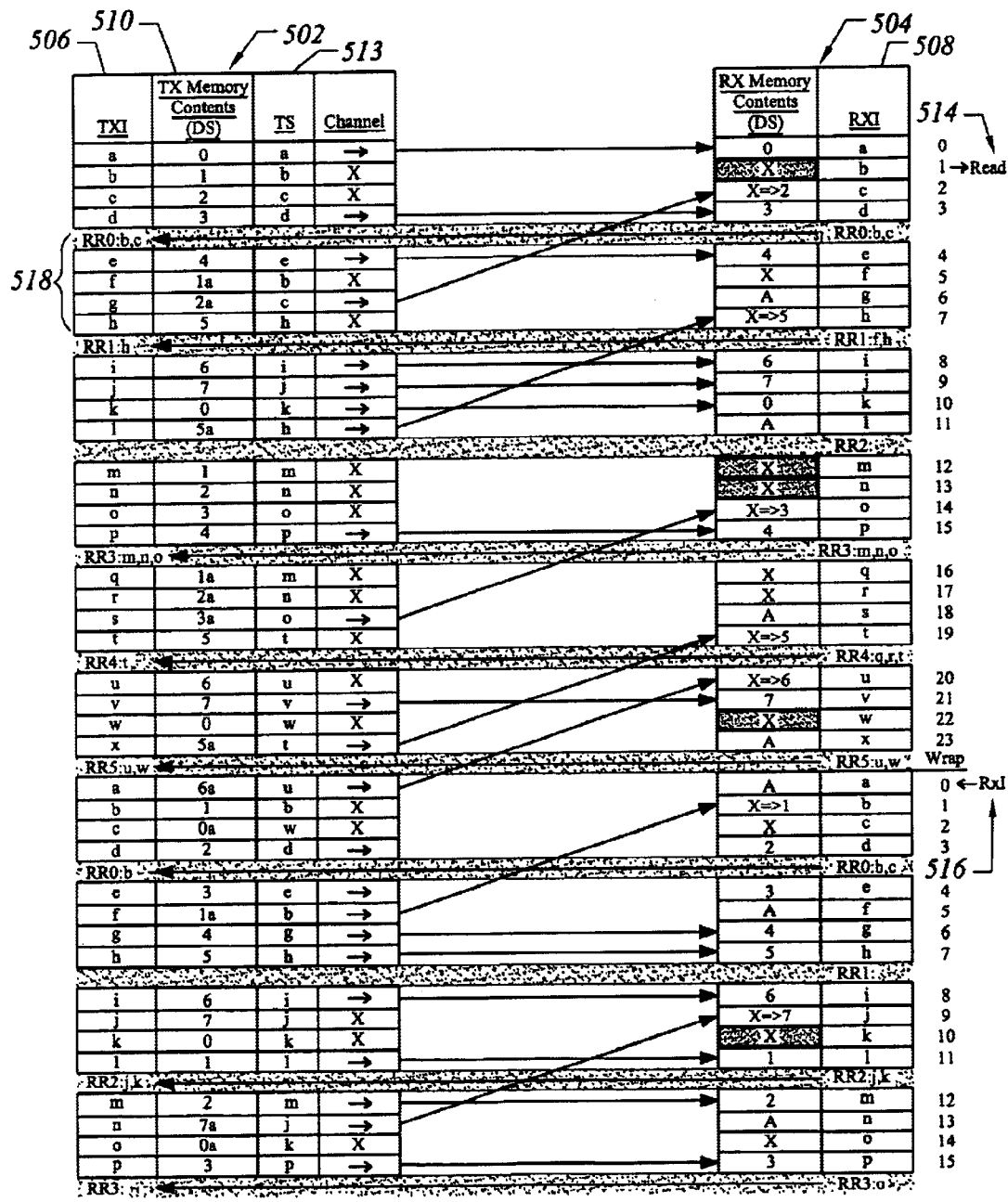
FIG. 4 is a simplified diagram depicting the operation of receiver and transmitter memory according to one embodiment of the present invention.

FIG. 4 is a diagram depicting the operation of receiver and transmitter memory according to one embodiment of the present invention. Table 502 depicts contents of transmitter memory 208 and table 504 depicts contents of receiver memory 210. A TXI column 506 is an index to transmitter memory 208. The TXI values there are used to synchronize the values in an RXI value column 508 which serves and index to receiver memory 210. A transmitter memory contents column 510 shows a DS for the codeword at each TXI location. A TS column 511 gives the TS for the codeword in each TXI location. For ARQ codewords the TS value is not the same as the TXI value. For entries in transmitter memory contents column 510, the suffix "a" in a DS value na indicates an ARQ retransmission of the codeword having DS value n.

A right arrow in a channel column 513 indicates successful transmission of the codeword across the channel. An X indicates unsuccessful transmission. Successful transmission of a codeword on the first attempt is represented by a horizontal arrow between tables 502 and 504. The codeword is then reproduced in the corresponding location in a receiver memory contents column 512. Other entries in receiver memory contents column 512 are marked with an X to indicate space reserved for a codeword that was never successfully received. Still other entries in receiver memory contents column 512 are marked with an X followed by the notation=>n indicating that a first transmission of the codeword was unsuccessful but that the spot was later filled by successful transmission of an ARQ codeword. This is also indicated by a diagonal line between the ARQ codeword position in table 502 and the address filled by the ARQ codeword in table 504. An A in receiver memory contents column 512 representing an ARQ marker indicating that an ARQ codeword occupied that time slot.

Each group of four rows in tables 502 and 504 corresponds to a transmitted supercodeword. The arrows pointing back to table 502 after each supercodeword specify a single RR field of a codeword transmitted over the reverse link. Each RR field specifies up to four errors in transmission of a supercodeword. For simplicity, in the depicted example, each erroneous codeword transmission causes a single RR which in turn causes transmission of a single ARQ codeword.

FIG. 4 also shows positions of a read pointer 514 and a pointer 516 indicating the current RXI value. These pointers repeatedly loop through address space so that memory is reused. If the read pointer passes a codeword hole, that was not filled there is an ARQ error. The relative movement of the read pointer and RXI value are described below.

Consider, for example, transmission of a supercodeword designated by a group of rows 518. The TXI slot "e" is used for a successful first transmission of the codeword having DS value 4. Thus 4 is written to the corresponding entry of receiver memory contents column 512. The TXI slot "f" is used for an unsuccessful ARQ retransmission of the codeword having DS value 1. The suffix "a" indicates retransmission. The receiver does not know what was transmitted in slot "f" so there is an "X" entry in receiver memory contents column 512 indicating an ARQ hole. TXI slot "g" is used for a successful ARQ retransmission of the codeword having DS value 2. This codeword is then written to the receiver memory location pointed to by RXI value "c." The RXI slot "g" is given an ARQ marker. The TXI slot "h" is used for the unsuccessful first transmission of the codeword having DS value 5. At the receiver end, a RR is sent back requesting retransmission of whatever was not received correctly, here the codewords transmitted at slots "f" and "h". The transmitter would only schedule "h" for retransmission since it knows "P" was an ARQ codeword and is already in the ARQ priority lists.

Figure 5:
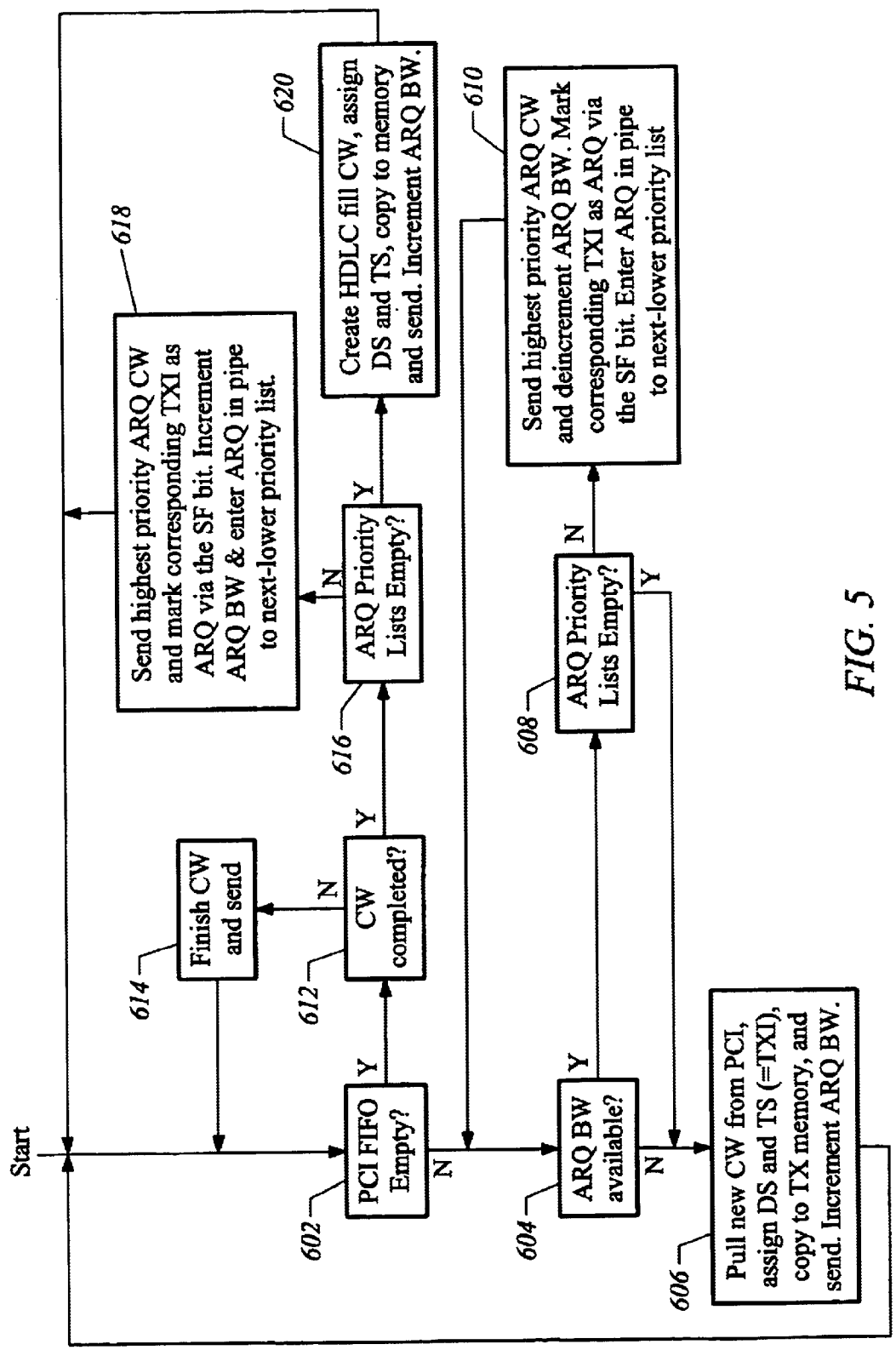
FIG. 5 is a flowchart describing steps of operating the transmit portion of an ARQ system according to one embodiment of the present invention.

FIG. 5 is a flowchart describing steps of operating the transmit portion of ARQ system 102 according to one embodiment of the present invention. At step 602, ARQ control block 205 checks if transmitter FIFO 204 is empty. If transmitter FIFO 204 is not empty, ARQ control block 205 checks at step 604 to see if there is an opportunity for transmission of an ARQ codeword. ARQ control 205 will only permit transmission of an ARQ codeword if two bandwidth criteria are satisfied. The first criterion is a maximum percentage of ARQ codewords allocated over time. The second criterion is a maximum number of ARQ codewords permitted in a burst. The bandwidth criteria are managed by maintaining an overhead counter (ARQ BW). The counter decrements by 1 for every transmission of an ARQ codeword and increments by 1/k for every transmission of a new codeword where k is a programmable parameter indicating the average number of first transmission codewords between each two successive ARQ codeword transmission opportunities. The bandwidth counter also has a programmable maximum value which limits the number of consecutive ARQ codewords that may be transmitted. Bandwidth is available for transmission of ARQ codewords if the integer part of the bandwidth counter value is greater than or equal to 1. Of course, it will be appreciated that one could within the scope of the present invention, design the ARQ system to run the counter to increment upon transmission of an ARQ codeword and decrement upon transmission of a new codeword and then apply a different test to determine the availability of ARQ bandwidth.

If step 604 determines that no ARQ bandwidth is available, then at step 606, a new codeword is pulled from transmitter FIFO 204. The new codeword is assigned a DS and a TS by ARQ control block 205. The DS is used at the receive end to identify gaps in received data. The TS is used at the receive end to determine when it must be written to PCI system 202. The new codeword is copied to transmitter RAM 208 and then sent through codec 212. The bandwidth counter is incremented by 1/k and ARQ processing returns to step 602.

If step 604 determines that ARQ bandwidth is available, ARQ control block 205 checks ARQ codewords awaiting transmission as listed on the ARQ priority lists at step 608. If these lists are empty, there are no ARQ codewords awaiting transmission and a new codeword is transmitted instead at step 606. If there are ARQ codewords awaiting transmission, processing proceeds to step 610.

There are a programmable number of ARQ transmission priority lists maintained by ARQ control block 205, each one corresponding to a different level of priority. The number of lists represents the maximum number of times an ARQ codeword will be transmitted if sufficient bandwidth is available. At step 610, ARQ control block 205 will select the oldest pending request for retransmission on the highest priority list that is not empty. This ARQ codeword is transmitted, the bandwidth counter is decremented by one. The ARQ codeword does not need to be copied to transmitter RAM 208, but a codeword worth of space is left empty. The ARQ codeword's TXI location is marked as an ARQ location by writing the SF memory bit at the same TXI address. ARQ control block 205 updates the priority lists by moving the entry that has just been processed to the next "lower" priority list. A programmable delay is associated with this movement to a lower priority list and this delay defines the minimum number of codewords between subsequent possible retransmissions of the same codeword. This prevents a burst error event in the channel from causing a particular codeword to be repeatedly corrupted and never be transmitted correctly. The priority list mechanism assures that available ARQ bandwidth is shared fairly among ARQ codewords that await transmission. After step 610, ARQ control block 205 proceeds to step 604 to check for further opportunities for transmission of ARQ codewords.

If step 602 determines that transmitter FIFO 204 is empty, ARQ control block 205 proceeds to step 612. Step 612 tests if the codeword sized piece of payload data last removed from transmitter FIFO 204 has been processed. If not, ARQ control block 205 finishes processing of the codeword and sends the codeword out at step 614 and then proceeds again to step 602.

If the previous codeword has been completed, processing proceeds to step 616 where ARQ control block 205 checks the ARQ priority lists for pending retransmission requests to be fulfilled. If there is a non-empty list, ARQ control block 205 goes to step 618 which performs processing similar to step 610 except that the bandwidth counter is incremented by 1/k rather than decremented. If there are no ARQ codewords to send out, ARQ control block 205 performs step 620 which essentially generates and sends out a filler codeword that is discarded at the receive end. Step 620 also increments the bandwidth counter by 1/k.

Figure 6:
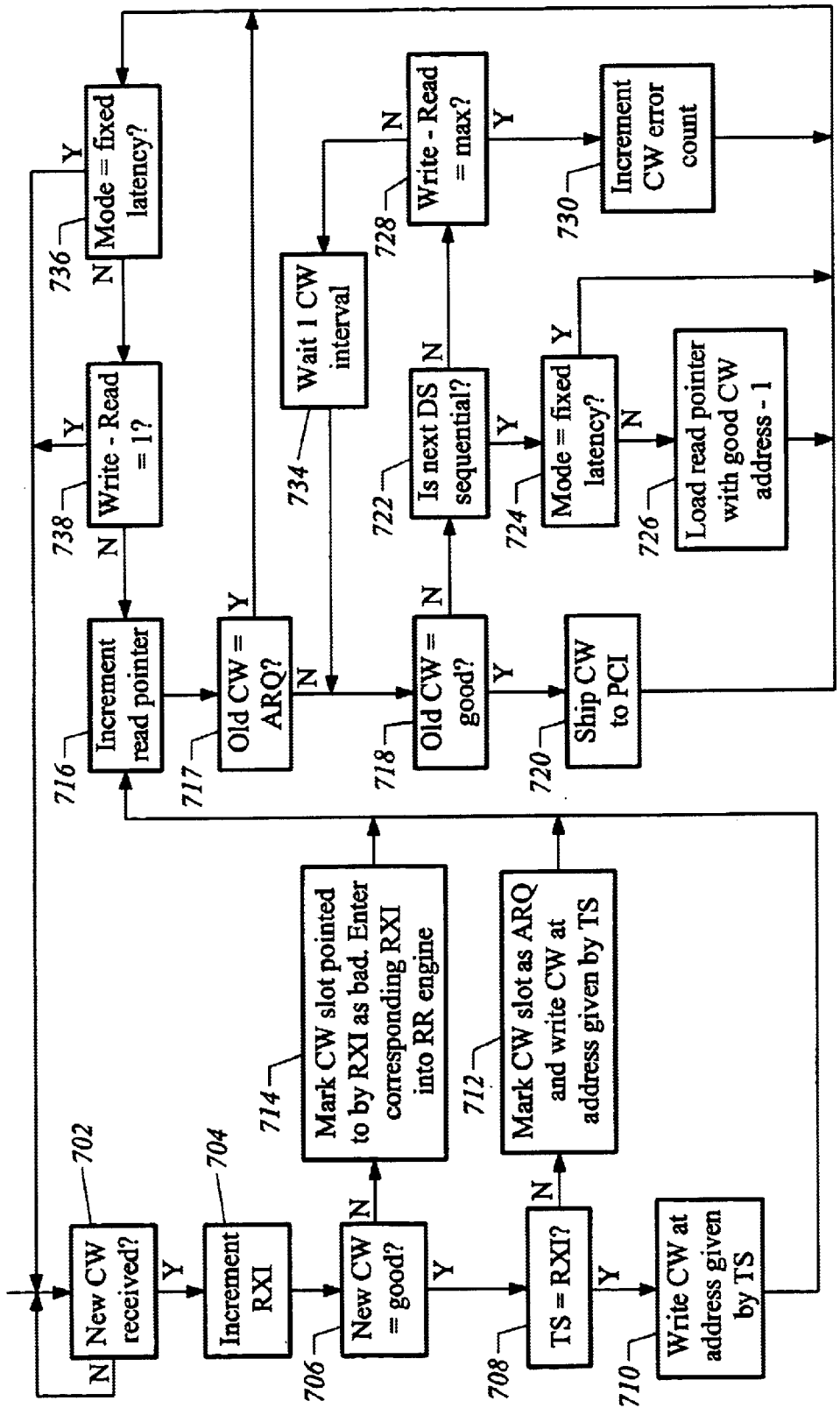
FIG. 6 is a flowchart describing steps of operating the receive portion of an ARQ system according to one embodiment of the present invention.

FIG. 6 is a flowchart describing steps of operating the receive portion of ARQ system 102 according to one embodiment of the present invention. For the embodiment described in FIG. 6, there is a single read pointer for both Voice and data but two latency modes, fixed and variable. At step 702, ARQ control block 205 checks for receipt of a new codeword. This step is repeated until a new codeword is actually received. Whenever a new codeword is received, RXI is incremented at step 704. Step 706 tests whether the new codeword has been received without errors.

If the new codeword has been received without errors, ARQ control block 205 checks if the TS value of the new codeword equals the current RXI value at step 708. If the values are equal, this indicates reception of a newly transmitted codeword and triggers writing the new codeword to receiver RAM 210 at an address determined by the TS at step 710. If the values are not equal, the newly received codeword is an ARQ codeword. The memory slot pointed to by the RXI is marked as ARQ and the ARQ codeword is written to the TS address at step 712. If the new codeword has an error, its slot in receiver RAM 210 pointed to by the RXI value is marked as bad and the RXI value is input for generating an RR to request retransmission at step 714.

The read pointer increments at step 716 which follows any of steps 710, 712, 714. At step 717, ARQ control block 205 checks if the location pointed to by the read pointer has an ARQ marker as defined above. If the location does not have an ARQ marker, execution proceeds to step 718 which checks if the location holds a good (correctly received) codeword. If the location has a good codeword, the codeword is written to PCI Receiver FIFO 206 at step 720. If the codeword is not a good codeword, execution proceeds to step 722 where ARQ control block 205 checks if the DS value of the next codeword follows in sequence. This helps determine how many codeword errors have not been corrected by the ARQ. If the next DS is sequential signifying that the previous bad codeword was an ARQ hole, step 724 determines if the current latency mode is fixed or variable. If the latency mode is variable, step 726 loads the read pointer with the value of the next good codeword address−1 to allow the read pointer to catch up to the write pointer. If the latency mode is fixed, execution returns to step 702.

If step 722 determines that the next DS is not sequential, step 728 checks if the difference between the write and read pointers has reached its maximum value indicating that the latency limit has been reached. If the latency limit has been reached signifying that the previous bad codeword represents a codeword hole, the codeword error count is incremented at step 730. If there is further available latency to be exploited to reduce errors, step 734 waits an additional codeword interval before again checking for a correct codeword to be received.

Step 736 follows any of steps 720, 726, or 730 and again tests for fixed or variable latency mode. If the latency mode is fixed, execution returns to step 702. If the latency-mode is variable, step 738 determines whether the difference between the write and read pointers is equal to 1. If the difference is equal to 1, then execution returns to step 702. If the difference does not equal to one, execution returns to step 716 for incrementation of the read pointer since the read pointer may now move closer to the write pointer.

Figure 7:
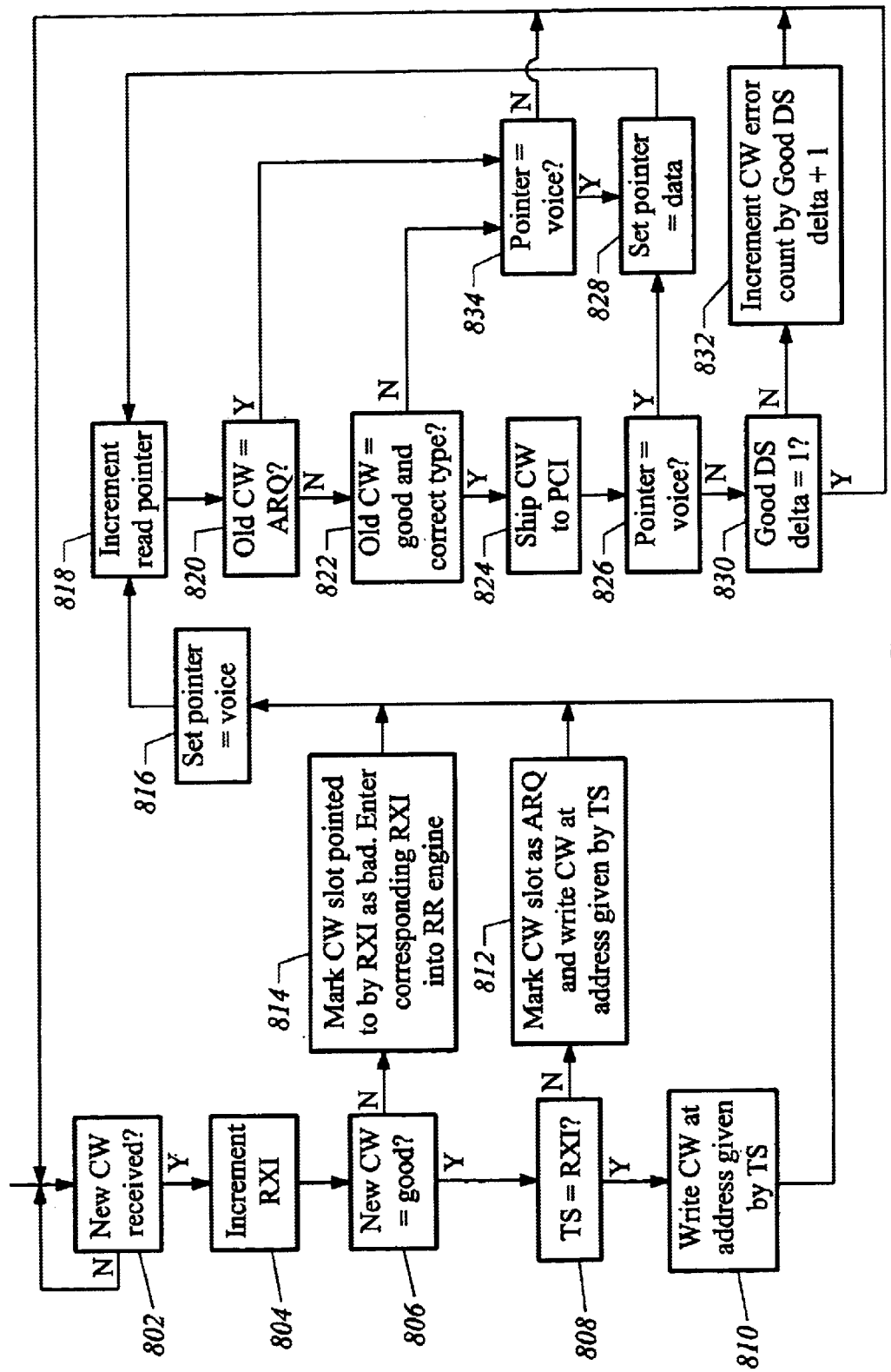
FIG. 7 is a flowchart describing steps of operating the receive portion of an ARQ system according to an alternative embodiment of the present invention.

FIG. 7 is a flowchart describing steps of operating the receive portion of ARQ system 102 according to an alternative embodiment of the present invention. In the embodiment depicted by FIG. 7, there is no variable latency mode but the system does assign different fixed latencies to voice and data traffic. The operation of steps 802 through 814 in receiving new codewords tracks steps 702 through 714 in FIG. 6.

A single read pointer changes between pointer values to accommodate voice and data traffic. To accommodate voice or other latency intolerant traffic, the voice read pointer value tracks the write pointer more closely than the data read pointer value. At step 816, the read pointer is set to the voice value. At step 818, the read pointer is incremented. At step 820, ARQ control block 205 checks if the read pointer points to an ARQ marker. If the read pointer does not point to an ARQ marker, step 822 checks that the location pointed to has a correctly received codeword and that the codeword is of the "correct type," i.e., voice if the pointer is set to voice and data if the pointer is set to data. The type is checked by looking at the voice flag bit of the codeword. If the codeword is a good codeword of the right type, step 824 writes the good codeword to PCI receiver FIFO 206. Then, step 826 tests if the pointer is currently set to voice or data. If the pointer is set to voice, step 828 sets the pointer to data and processing proceeds to step 818 to read a data codeword. If the pointer is set to data, step 830 checks if the new DS value followed the old one in sequence indicating no gap in good codewords. If there is a gap at read time, indicating one or more errors left uncorrected by ARQ, the error count is incremented by the difference in values between the current DS value and last good DS value plus one at step 832.

If the read pointer is determined at step 820 to point to an ARQ marker or at step 822 to point to a bad codeword or one of the wrong traffic type, step 834 checks if the pointer is currently set to voice or data. If the pointer is set to voice, step 828 sets the pointer to data. If the pointer is set to data, then processing goes back to step 818.

It should be noted that in implementing an ARQ system described by the flowcharts of FIGS. 6–7, it may be necessary to limit the amount of time spent on the right side of the flowchart (writing to memory) so that the system is always ready to receive new codewords as they arrive.

Figure 8:
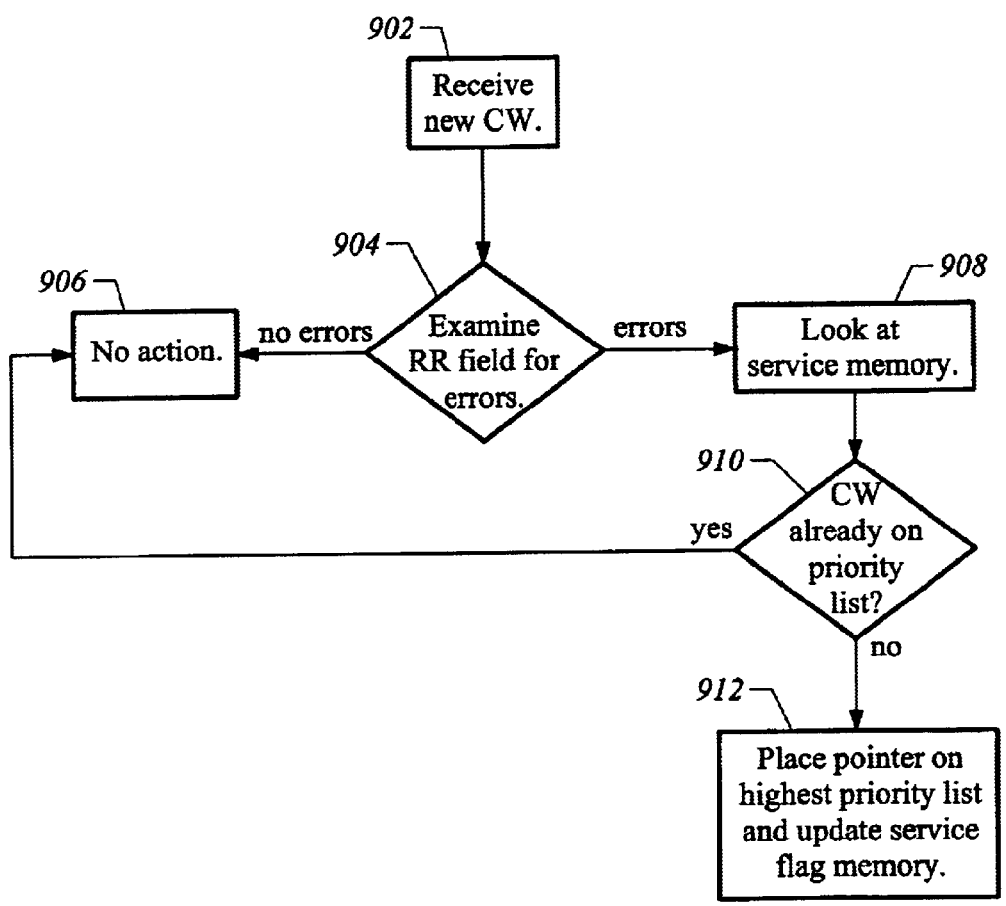
FIG. 8 is a flowchart describing steps of placing new pointers to ARQ codewords on the priority lists at the transmit end according to one embodiment of the present invention.

FIG. 8 is a flowchart describing steps of placing new TXI values pointing to ARQ codewords on the priority lists at the transmit end according to one embodiment of the present invention. At step 902, a new codeword is received. At step 904, the SCWEV of the RR field is checked by ARQ control block 205 for any set bits indicating an error. If there are no errors, step 906 takes no action. If there are errors, at step 908, the SCWI is used to index a service memory which holds a continually updated history of which codewords in which supercodewords have had their TXIs entered into the ARQ priority lists. Step 910 tests whether the service memory indicates that the codewords referenced by the new RR have already been placed on the priority lists. If one or more codewords haven't been placed on the lists yet, pointers to them are now placed on the highest priority list at step 912 and the corresponding service flag memory location is changed to reflect the new list entry. If the codeword has been placed on the lists, no further action is now taken since this is a repeat of an RR that has already been processed. As described above when a new ARQ codeword is to be transmitted it is taken from the highest priority list. Before an ARQ codeword entry is output by a priority list to address an ARQ codeword, its age is checked against a Value that assures a maximum latency. Entries that are too old are discarded. The entry is then shifted to the next lowest priority list after a programmable delay that assures a minimum spacing between repeats of the same ARQ codeword. The number of lists gives the number of retransmissions that occur if bandwidth is available.

The process of placing a new RR on the priority lists after receipt of a bad codeword is substantially similar to the process described in reference to FIG. 8. Also, RRs are checked for age before transmission to assure that RRs are not sent for codewords that have already been overwritten in transmitter RAM 208. Typically, there will be more retransmissions of RRs than ARQ codewords. There is however, no service flag memory for RRs since the receiver cannot determine that a bad codeword is a repeat.

It is understood that the examples and embodiments described herein are for illustrative purposes only and that various modifications or changes in light thereof will be suggested to persons skilled in the art and are to be included within the spirit and purview of this application and scope of the appended claims and their full scope of equivalents. For example, one may devise a receive ARQ system that incorporates both fixed and variable latency and also accommodates a mixture of voice and data traffic. Also, multiport memories may be substituted for the single port memories in the diagram. Also, flowchart steps may be performed in any order, may be substituted for by other steps, or may be deleted entirely. All publications, patents, and patent applications cited herein are hereby incorporated by reference.

What is claimed is:

1. In a digital communications system, a method for combining transmission of new data with retransmission of data requested by a receiver comprising:
   monitoring a percentage of time devoted to retransmission;
   allocating a slot for either transmission of new data or data retransmission based upon comparison of said monitored percentage to a programmed maximum percentage of time to be used for retransmission; and
   transmitting or retransmitting during said slot according to said allocation.

2. The method of claim 1 wherein monitoring comprises: testing a state of an overhead counter.

3. The method of claim 2 further comprising:
   incrementing said overhead counter upon allocation of said slot for transmission of new data; and
   decrementing said overhead counter upon allocation of said slot for data retransmission.

4. The method of claim 3 wherein an increment size of said incrementing is chosen relative to a decrement size of said decrementing to set a maximum available overhead for transmission.

5. The method of claim 3 wherein a maximum value of said overhead counter sets a maximum capacity for handling burst reception errors.

6. The method of claim 2 further comprising:
   decrementing said overhead counter upon allocation of said slot for transmission of new data; and
   incrementing said overhead counter upon allocation of said slot for data retransmission.

7. The method of claim 6 wherein an increment size of said incrementing is chosen relative to a decrement size of said decrementing to set a maximum available overhead for transmission.

8. The method of claim 6 wherein a maximum value of said overhead counter sets a maximum capacity for handling burst reception errors.

9. In a digital communications system, apparatus for combining transmission of new data with retransmission of data requested by a receiver comprising:
   a transmitter control block that monitors a percentage of time devoted to retransmission and allocates a slot for either transmission of new data or data retransmission based upon a comparison of said monitored percentage to a programmed maximum percentage of time to be used for retransmission; and
   a selector that transmits or retransmits during said slot according to said allocation.

10. The apparatus of claim 9 wherein said transmitter control block comprises an overhead counter and said transmitter control block monitors by testing a state of said overhead counter.

11. The apparatus of claim 10 wherein said transmitter control block:
   increments said overhead counter upon allocation of said slot for transmission of new data; and
   decrements said overhead counter upon allocation of said data transmission opportunity for data retransmission.

12. The apparatus of claim 11 wherein an increment size of said incrementing is chosen relative to a decrement size of said decrementing to set a maximum available overhead for transmission.

13. The apparatus of claim 11 wherein a maximum value of said overhead counter sets a maximum capacity for handling burst reception errors.

14. The apparatus of claim 10 wherein said transmitter control block decrements said overhead counter upon allocation of said slot for transmission of new data; and increments said overhead counter upon allocation of said slot for data retransmission.

15. The apparatus of claim 14 wherein an increment size of said incrementing is chosen relative to a decrement size of said decrementing to set a maximum available overhead for transmission.

16. The apparatus of claim 14 wherein a maximum value of said overhead counter sets a maximum capacity for handling burst reception errors.

17. In a digital communications system, apparatus for combining transmission of new data with retransmission of data requested by a receiver, said apparatus comprising:

means for monitoring a percentage of time devoted to retransmission;

means for allocating a slot for either transmission of new data or data retransmission based upon comparison of said monitored percentage to a programmed maximum percentage of time to be used for retransmission; and means for transmitting or retransmitting during said slot according to said allocation.

* * * * *